(12) United States Patent
Webb et al.

(10) Patent No.: US 11,313,301 B2
(45) Date of Patent: Apr. 26, 2022

(54) CONTROL OF EXHAUST ENERGY IN INTERNAL COMBUSTION ENGINES

(71) Applicant: PACCAR Inc, Bellevue, WA (US)

(72) Inventors: Cynthia Chaffin Webb, Sedro-Woolley, WA (US); Michael Douglas Gerty, Bellingham, WA (US); Uday Vadlamani, Burlington, WA (US); Kimberly Denise McKinnon, Anacortes, WA (US); Constantin Emil Nedelcu, Bellingham, WA (US); Maarten Meijer, Anacortes, WA (US); Charles Wayne Reinhardt Swart, Bellingham, WA (US)

(73) Assignee: PACCAR INC, Bellevue, WA (US)

( * ) Notice: Subject to any disclaimer, the term of this patent is extended or adjusted under 35 U.S.C. 154(b) by 30 days.

(21) Appl. No.: 16/817,201

(22) Filed: Mar. 12, 2020

(65) Prior Publication Data
US 2020/0408163 A1 Dec. 31, 2020

Related U.S. Application Data

(60) Provisional application No. 62/868,689, filed on Jun. 28, 2019.

(51) Int. Cl.
*F02D 41/06* (2006.01)
*F02M 26/13* (2016.01)
(Continued)

(52) U.S. Cl.
CPC .......... *F02D 41/068* (2013.01); *F01N 3/021* (2013.01); *F01N 3/2013* (2013.01);
(Continued)

(58) Field of Classification Search
CPC .... F02B 63/04; F02D 41/068; F02D 41/0245; F02D 41/0002; F02D 41/0087;
(Continued)

(56) References Cited

U.S. PATENT DOCUMENTS

| 8,720,185 | B2 | 5/2014 | Webb et al. |
| 2006/0086546 | A1 | 4/2006 | Hu et al. |

(Continued)

FOREIGN PATENT DOCUMENTS

| WO | 2017/127219 | 7/2017 |
| WO | 2018/165438 | 9/2018 |
| WO | 2020/192973 | 10/2020 |

*Primary Examiner* — Audrey B. Walter
*Assistant Examiner* — Dapinder Singh
(74) *Attorney, Agent, or Firm* — Seed IP Law Group LLP

(57) ABSTRACT

Methods of improving SCR performance in heavy duty vehicles may use multiple interdependent control techniques to increase engine exhaust temperatures in a fuel efficient manner. One method combines cylinder deactivation and mechanical loading of an engine by an electrical generator used to input energy into an exhaust stream to manipulate the exhaust temperature through the combined effect of modified air-to-fuel ratio and supplemental energy input. In particular, cylinder deactivation may be used to modify the engine air flowrate and the electric generator may be used to apply mechanical load on the engine to manipulate the engine fuel flow rate to control the engine air-to-fuel ratio and thereby increase exhaust temperatures. The exhaust temperatures may be further increased by using the electrical generator to add the energy generated as input energy to the exhaust stream.

17 Claims, 7 Drawing Sheets

(51) Int. Cl.
*F01N 3/02* (2006.01)
*F01N 3/20* (2006.01)
*F01N 3/021* (2006.01)
*F01N 3/28* (2006.01)
*F02B 63/04* (2006.01)
*F02D 17/02* (2006.01)

(52) U.S. Cl.
CPC ............. *F01N 3/2066* (2013.01); *F01N 3/28* (2013.01); *F02B 63/04* (2013.01); *F02D 17/02* (2013.01); *F02M 26/13* (2016.02)

(58) Field of Classification Search
CPC .. F02D 2041/026; F01N 3/021; F01N 3/2013; F01N 3/2066; F01N 3/2026; F01N 3/28; F01N 9/00; F01N 2260/08; F01N 2430/02; F01N 2430/06; F01N 2590/08; F01N 2610/02; F01N 2900/08; F01N 2900/1411; F01N 2900/1404; F01N 2900/1602; F01N 2900/1626; F01N 2900/1631; F02M 26/13; Y02T 10/12; Y02T 10/50; Y02A 50/20
See application file for complete search history.

(56) References Cited

U.S. PATENT DOCUMENTS

| | | | |
|---|---|---|---|
| 2013/0263576 A1 | 10/2013 | Douglas et al. | |
| 2014/0075921 A1* | 3/2014 | Chavannavar | F01N 9/00 60/274 |
| 2015/0135680 A1* | 5/2015 | Ancimer | F02D 41/029 60/274 |
| 2015/0283991 A1* | 10/2015 | Dalum | B60W 30/1888 701/22 |
| 2016/0084182 A1* | 3/2016 | Ancimer | F02D 41/0087 60/274 |
| 2017/0355373 A1* | 12/2017 | Dalum | B60K 6/48 |

* cited by examiner

CONTROL OF EXHAUST ENERGY IN INTERNAL COMBUSTION ENGINES

BACKGROUND

Technical Field

The present disclosure relates generally to control of exhaust energy in internal combustion engines, and more particularly to fuel efficient control of exhaust energy in internal combustion engines.

Description of the Related Art

Regulated emissions from today's heavy-duty engines demand very low levels of tailpipe emissions, and standards are expected to be further reduced in the near future. To reduce engine out exhaust emissions, current technologies rely on aggressive engine control strategies and exhaust after-treatment catalyst systems (catalyst systems used to treat engine exhaust are referred to herein as exhaust after-treatment systems, emissions after-treatment systems, or EAS). The EAS for a typical heavy-duty diesel or other lean-burning engine may include a diesel oxidation catalyst (DOC) to oxidize unburned fuel and carbon monoxide, a diesel particulate filter (DPF) for control of particulate matter (PM), selective catalytic reduction (SCR) systems for reduction of oxides of nitrogen (NOX), and/or an ammonia oxidation catalyst (AMOX). Performance of EAS systems is dependent upon exhaust gas temperature and other parameters.

Additionally, SCR processes often use secondary fluid injection by injecting a fluid referred to as DEF (diesel emission fluid), which acts as a NOX reductant over the SCR catalyst. DEF is an aqueous solution that evaporates and decomposes to chemically release and make available ammonia for reaction in an SCR system. A lower temperature threshold for efficient SCR operation exists at a lower temperature limit for DEF injection, which is about 190° C. FIG. 1 shows a NOX conversion efficiency curve for a diesel SCR system, assuming that sufficient ammonia is present. FIG. 1 also shows a range of operation over which DEF injection is not feasible. In this range of operation, actual SCR efficiency is much lower than shown on the curve because sufficient ammonia is not present.

Heavy-duty engines can be operated under a wide range of load conditions, including highway driving, urban driving, and extended idling. Proposed regulations include a new emissions test cycle referred to as the Low Load Cycle (LLC), which may be promulgated by one or more of various governmental regulatory or standards-setting bodies, such as the California Air Resources Board, and which includes lower engine load points than current regulatory load cycles. The range of exhaust temperatures for current regulatory load cycles and in-use operation is typically high enough for suitable SCR catalyst operation, as illustrated in FIG. 2. Lower load operation, such as urban driving, however, can include extended idling and other motoring events that result in exhaust temperatures too low for suitable SCR catalyst operation. The proposed LLC includes heavy weighting on such idling and other motoring events, resulting in low exhaust temperatures. Measured SCR inlet exhaust temperature for a current production engine running the proposed LLC is shown in FIG. 3.

The proposed LLC is expected to require very high, such as greater than 90%, SCR conversion efficiency to meet regulated emissions levels. However, as seen in FIG. 3, current production engines produce exhaust gas temperatures over much of the proposed LLC that are too low for suitable DEF injection, and that are too low for suitable SCR catalyst operation even if DEF injection is feasible, as shown in FIG. 4.

BRIEF SUMMARY

A method may be summarized as comprising: warm idling an internal combustion engine, thereby producing exhaust; reducing a volumetric flow rate of air through the engine; increasing a mechanical load to the engine, thereby increasing an amount of fuel demanded by the engine; and inputting energy from a source of electrical energy into the exhaust. Increasing a mechanical load to the engine may include using the running engine to drive an electric generator. The method may further comprise charging a battery with electric energy generated by the electric generator. The electric generator may be the source of electric energy. Inputting energy into the exhaust may include using an electrically heated catalyst system.

Reducing the volumetric flow rate of air through the engine may include reducing the volumetric flow rate of air through the engine by half. Reducing the volumetric flow rate of air through the engine may include deactivating one or more cylinders of the engine. Reducing the volumetric flow rate of air through the engine may include recirculating the exhaust through the engine. Reducing the volumetric flow rate of air through the engine may include reducing an idle speed of the engine. Reducing a volumetric flow rate of air through the engine may be performed simultaneously or concurrently with increasing a mechanical load to the engine and inputting energy into the exhaust.

A method may be summarized as comprising, simultaneously: idling an internal combustion engine with at least one cylinder of the engine firing and at least one cylinder of the engine deactivated, thereby producing exhaust; using the idling engine to drive an electric generator; and inputting electrical energy generated by the electric generator into the exhaust. Idling the internal combustion engine with at least one cylinder of the engine deactivated may reduce a volumetric flow rate of air through the engine relative to idling the engine with all cylinders of the engine firing; using the idling engine to drive an electric generator may apply a mechanical load to the engine and increase an amount of fuel demanded by the engine relative to idling the engine without using the idling engine to drive an electric generator; reducing the volumetric flow rate of air through the engine and increasing the amount of fuel demanded by the engine may reduce an air-to-fuel ratio within the engine and increase a temperature of the exhaust; and inputting electrical energy generated by the electric generator into the exhaust may increase the temperature of the exhaust.

A heavy duty vehicle may be summarized as comprising: an internal combustion engine; an exhaust after-treatment system; and a control system; wherein the control system, in operation, controls the vehicle, the internal combustion engine, and the exhaust after-treatment system to simultaneously: idle or warm idle the internal combustion engine with at least one cylinder of the engine firing and at least one cylinder of the engine deactivated; use the internal combustion engine to drive an electric generator; and input electrical energy generated by the electric generator into exhaust produced by the internal combustion engine. The internal combustion engine may be a diesel engine. The exhaust after-treatment system may include a diesel oxidation catalyst, a diesel particulate filter, a selective catalytic reduction system, and/or ammonia oxidation catalyst system.

DETAILED DESCRIPTION

Figure 1:
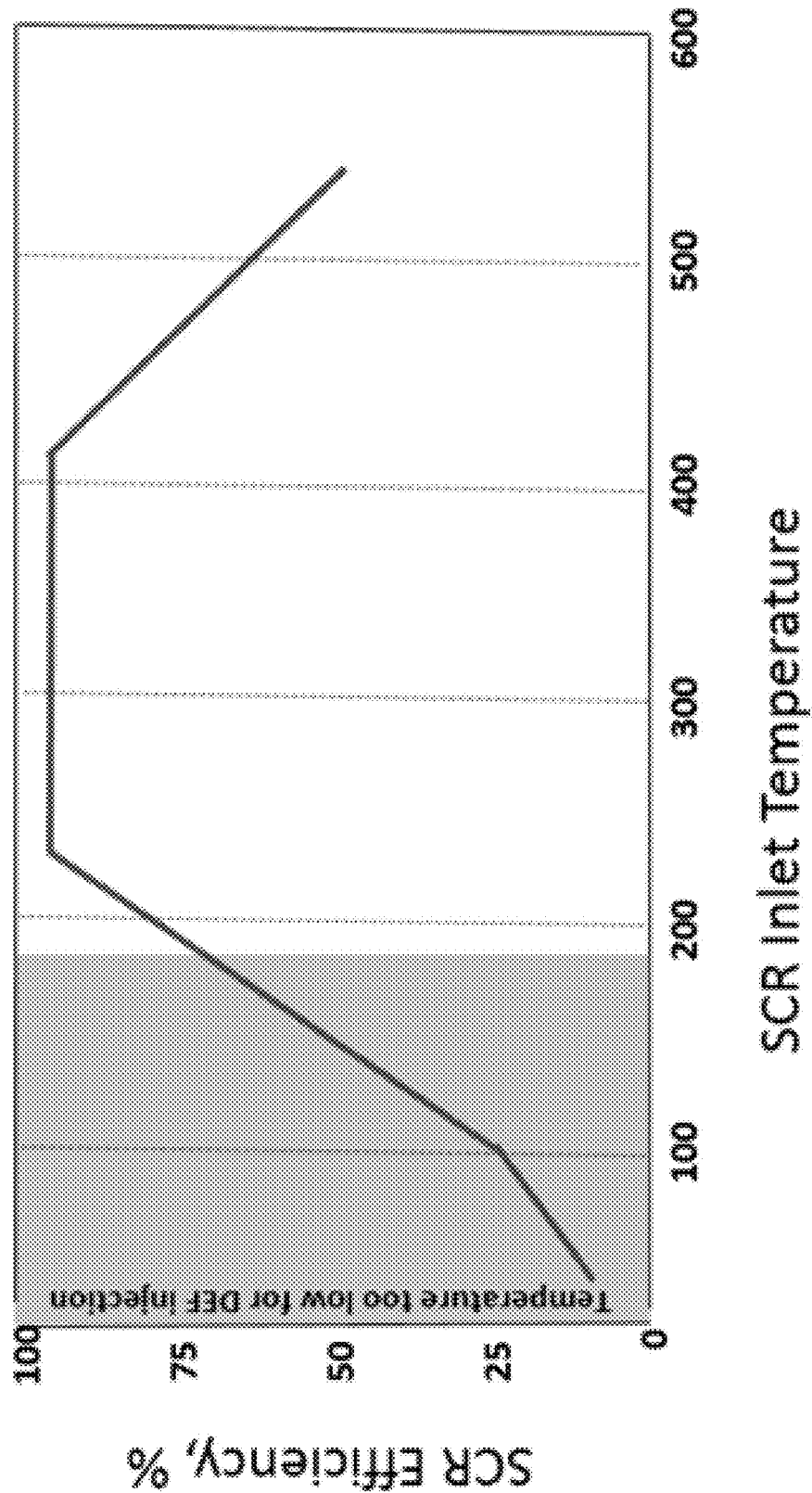
FIG. 1 illustrates typical SCR conversion efficiency as a function of exhaust temperature.
Figure 2:
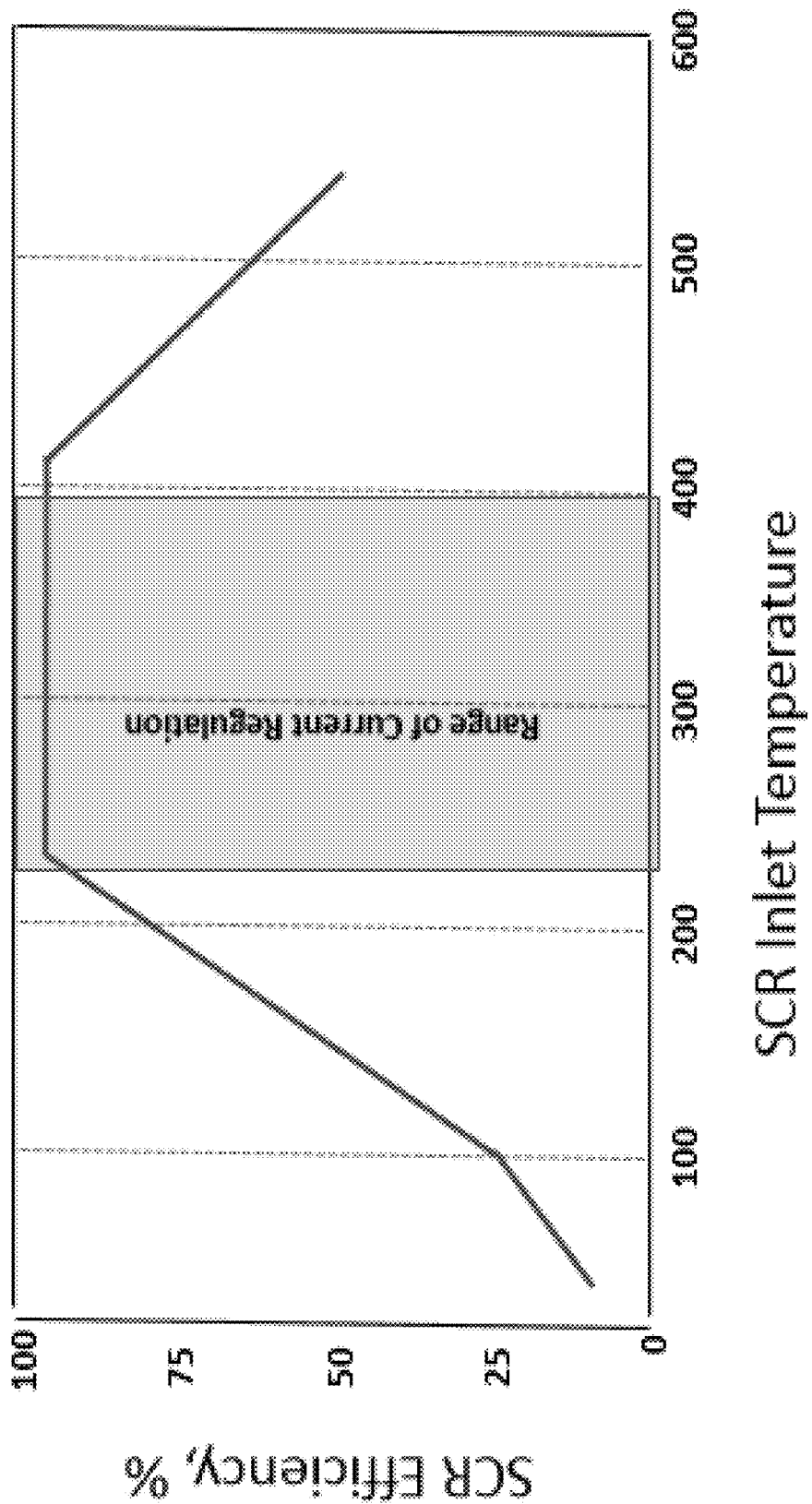
FIG. 2 illustrates a range of exhaust temperature operation for current production engines on current regulatory load cycles and in-use operation.
Figure 3:
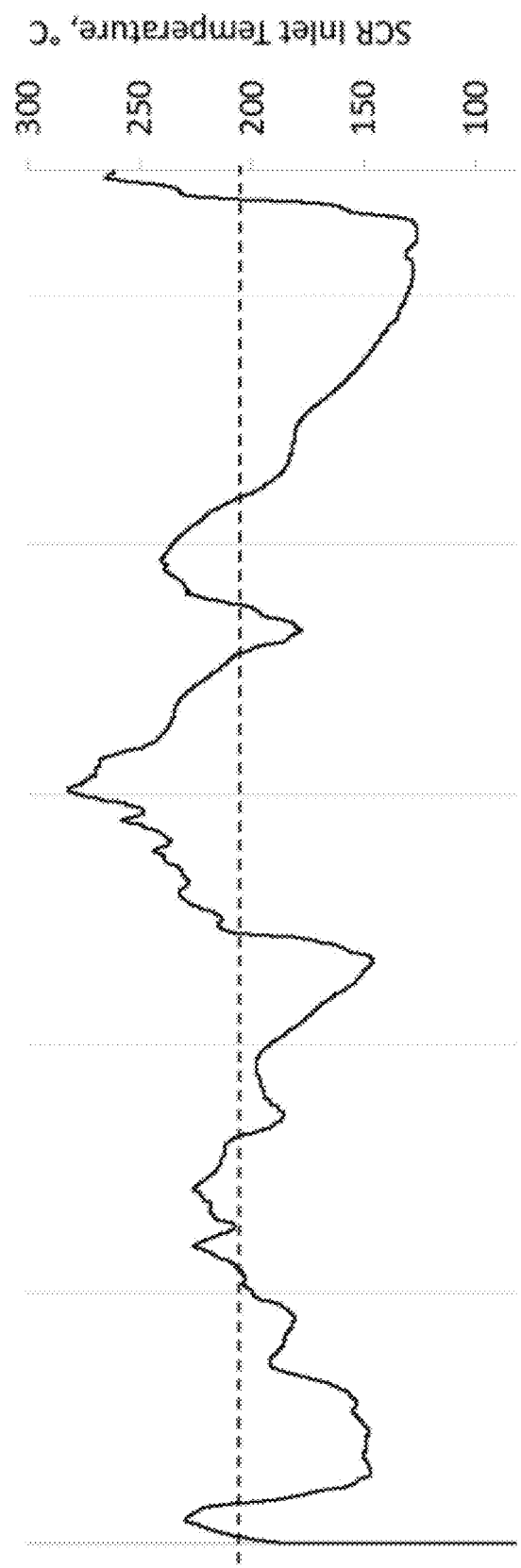
FIG. 3 illustrates exhaust gas temperatures for current production engines over a proposed Low Load Cycle.
Figure 4:
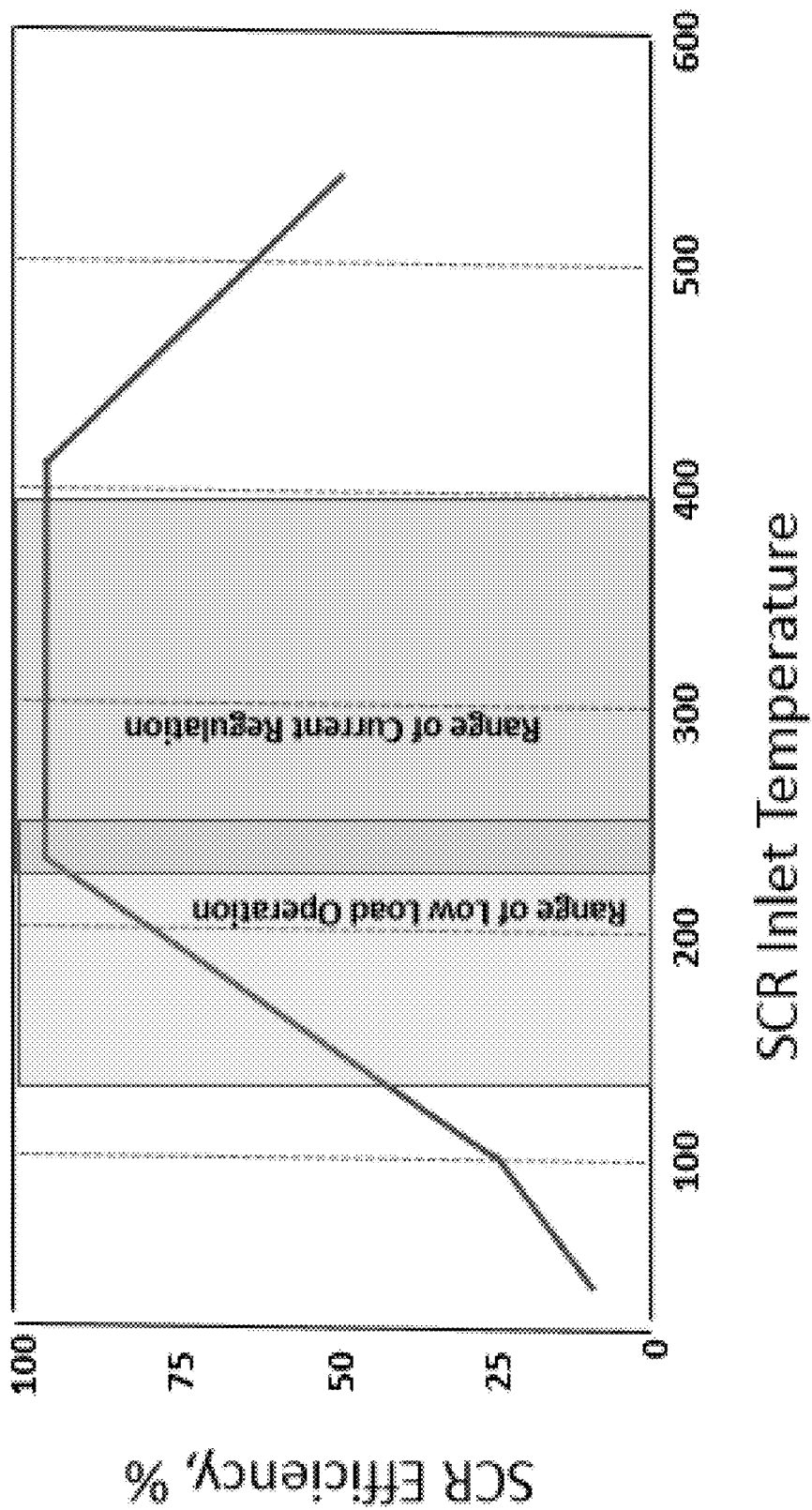
FIG. 4 illustrates ranges of exhaust temperatures for current production engines on current regulatory load cycles and the proposed Low Load Cycle.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

One approach to meeting regulated NOX emissions levels over the proposed LLC would be to introduce additional engine control systems and/or exhaust after-treatment devices, and to inject energy into the exhaust to increase its temperature to improve performance of the SCR systems. Such an approach may be similar to existing "cold start" solutions and may incur a fuel penalty and increase overall fuel consumption, which would decrease engine efficiency and make it more difficult to meet carbon emissions requirements. The present disclosure therefore describes approaches to meeting regulated NOX emissions levels over the proposed LLC by increasing a temperature of the exhaust, particularly under urban driving and idling conditions, while maintaining or substantially reducing the fuel penalty compared to baseline engine operation.

In some embodiments, a method of improving SCR performance in a heavy duty vehicle including an internal combustion engine, such as a diesel engine, as well as a control system for controlling operation and performance of the engine, includes operating the vehicle and its engine, such as by driving the vehicle on highway and/or city streets, and/or idling the engine. As used herein, the term "idling" means that the engine is running but the vehicle is not moving, such that the engine powers parasitic or ancillary devices in the vehicle, such as air conditioning, radio, fans, etc., but is not used to propel the vehicle. As used herein, the term "warm idling" means that the engine has been running for sufficient time such that its temperature is elevated above ambient environmental temperatures and has stabilized or reached a substantially steady state. Depending on the circumstances, the temperature of a warm idling diesel engine or of a coolant therein may be above 100 degrees Celsius or above 200 degrees Celsius. Operation of the vehicle and its internal combustion engine, whether the vehicle is driving or the engine is idling or warm idling, produces exhaust gases.

In some embodiments, the method further includes controlling a volumetric flow rate of air through the engine, such as reducing the volumetric flow rate of air through the engine, such as relative to a baseline volumetric flow rate of air through the engine. Reducing the volumetric flow rate of air through the engine may comprise reducing the volumetric flow rate of air by greater than 0%, 10%, 20%, 30%, 40%, 50%, 60%, 70%, 80%, or 90%, and/or less than 10%, 20%, 30%, 40%, 50%, 60%, 70%, 80%, 90%, or 100%, relative to the baseline volumetric flow rate of air through the engine. Reducing the volumetric flow rate of air through the engine may comprise reducing the volumetric flow rate of air by half, or 50%, or between 45% and 55%, or between 40% and 60%, or between 35% and 65%, or between 30% and 70% relative to the baseline volumetric flow rate of air through the engine.

In some embodiments, the volumetric flow rate of air through the engine is reduced by deactivating one or more cylinders of the engine, which may be referred to herein as cylinder deactivation or CDA. For example, if the engine has four total cylinders, the volumetric flow rate of air through the engine can be reduced by operating the engine with one cylinder firing and three cylinders deactivated, or with two cylinders firing and two cylinders deactivated, or with three cylinders firing and one cylinder deactivated. As another example, if the engine has six total cylinders, the volumetric flow rate of air through the engine can be reduced by operating the engine with one cylinder firing and five cylinders deactivated, or with two cylinders firing and four cylinders deactivated, or with three cylinders firing and three cylinders deactivated, or with four cylinders firing and two cylinders deactivated, or with five cylinders firing and one cylinder deactivated. As another example, if the engine has eight total cylinders, the volumetric flow rate of air through the engine can be reduced by operating the engine with one cylinder firing and seven cylinders deactivated, or with two cylinders firing and six cylinders deactivated, or with three cylinders firing and five cylinders deactivated, or with four cylinders firing and four cylinders deactivated, or with five cylinders firing and three cylinders deactivated, or with six cylinders firing and two cylinders deactivated, or with seven cylinders firing and one cylinder deactivated. As other examples, the volumetric flow rate of air through the engine can be reduced by operating the engine with one quarter, or one third, or one half, or two thirds, or three quarters of its cylinders deactivated and the remaining cylinders firing.

In other embodiments, the volumetric flow rate of air through the engine is reduced by recirculating at least a portion of the exhaust gases through the engine, which may be referred to as exhaust gas recirculation or EGR. For example, recirculating at least a portion of the exhaust gases through the engine may comprise recirculating greater than 0%, 10%, 20%, 30%, 40%, 50%, 60%, 70%, 80%, or 90%, and/or less than 10%, 20%, 30%, 40%, 50%, 60%, 70%, 80%, 90%, or 100% of the volumetric flow of the exhaust gases through the engine. In still other embodiments, the volumetric flow rate of air through the engine is reduced by reducing a speed, such as in terms of revolutions per minute or RPM, at which the engine and/or its firing cylinders run relative to a baseline speed of the engine and/or its firing cylinders, such as while idling (i.e., an "idle speed" of the engine). For example, reducing the speed at which the engine and its firing cylinders run may comprise reducing the speed by greater than 0%, 10%, 20%, 30%, 40%, 50%, 60%, 70%, 80%, or 90%, and/or less than 10%, 20%, 30%, 40%, 50%, 60%, 70%, 80%, 90%, or 100% relative to a baseline speed such as a baseline idle speed and/or a speed when all cylinders of the engine are firing. While the volumetric flow rate of air through the engine may be reduced by any of the techniques described herein, it has been found that cylinder deactivation is in many cases cleaner than other options in terms of emissions and more efficient than other options in terms of fuel use, and is therefore preferred in many embodiments.

In some embodiments, the method further includes increasing an amount of fuel demanded by the engine and/or a flow rate of a fuel through the engine, such as relative to a baseline amount of fuel demanded by the engine and/or baseline flow rate of the fuel through the engine. Increasing the amount of fuel demanded by the engine or the flow rate of the fuel through the engine may comprise an increase of greater than 0%, 10%, 20%, 30%, 40%, 50%, 60%, 70%, 80%, or 90%, and/or less than 10%, 20%, 30%, 40%, 50%, 60%, 70%, 80%, 90%, or 100%, relative to the baseline amount of fuel demanded and/or baseline flow rate of the fuel through the engine.

Increasing the fuel demand or the fuel flow rate through the engine may comprise loading the engine by applying a mechanical load to the engine. In some embodiments, such a mechanical load may be an electrical generator, such as an alternator, a dynamo, or other electric generation device, which is driven by the engine to generate electric energy, such that operation of the electrical generator to generate electric energy applies a mechanical load to the engine and thereby increases an amount of fuel demanded by the engine and/or increases a flow rate of the fuel through the engine. In some implementations, the vehicle can include a battery and the electric generator can charge the battery such that the battery stores the electric energy generated by the electrical generator. Reducing the volumetric flow rate of air through the engine and increasing an amount of fuel demanded by the engine and a flow rate of fuel through the engine reduces an air-to-fuel ratio within the engine and can increase the temperature of the exhaust gases produced by the engine. For example, combustion of more fuel in less air results in more energy distributed across a smaller mass.

In some embodiments, the method further includes directly inputting or injecting energy into the exhaust gases, thereby increasing their temperature. Inputting energy directly into the exhaust gases may comprise inputting at least 0.5 kW, 1.0 kW, 1.5 kW, 2.0 kW, 3.0 kW, 4.0 kW, 5.0 kW, 6.0 kW, 7.0 kW, 8.0 kW, 9.0 kW, 10.0 kW, 11.0 kW, 12.0 kW, 13.0 kW, 14.0 kW, 15.0 kW, 16.0 kW, 17.0 kW, 18.0 kW, 19.0 kW, 20.0 kW, 21.0 kW, 22.0 kW, 23.0 kW, 24.0 kW, 25.0 kW, 26.0 kW, 27.0 kW, 28.0 kW, 29.0 kW, or 30.0 kW, and no more than 1.0 kW, 1.5 kW, 2.0 kW, 3.0 kW, 4.0 kW, 5.0 kW, 6.0 kW, 7.0 kW, 8.0 kW, 9.0 kW, 10.0 kW, 11.0 kW, 12.0 kW, 13.0 kW, 14.0 kW, 15.0 kW, 16.0 kW, 17.0 kW, 18.0 kW, 19.0 kW, 20.0 kW, 21.0 kW, 22.0 kW, 23.0 kW, 24.0 kW, 25.0 kW, 26.0 kW, 27.0 kW, 28.0 kW, 29.0 kW, 30.0 kW, or 31.0 kW into the exhaust gases. Inputting energy directly into the exhaust gases may comprise inputting 5.0 kW, between 4.5 kW and 5.5 kW, between 4.0 kW and 6.0 kW, between 3.5 kW and 6.5 kW, or between 3.0 kW and 7.0 kW into the exhaust gases. In some embodiments, a fuel may be combusted, such as by a burner, within the exhaust gas stream to introduce thermal energy into the exhaust gas stream and thereby increase a temperature of the exhaust gas. In other embodiments, a source of electric energy and/or an electrically heated catalyst (EHC) system are used to input the energy directly into the exhaust gases. Various suitable electrically heated catalyst systems are known in the field and commercially available, such as under the brand name Continental Emitec, for such purposes.

Inputting energy such as thermal energy directly into the exhaust gases in this manner increases the temperature of the exhaust gases. Further, inputting energy directly into the exhaust gases in this manner becomes increasingly effective at raising the temperature of the exhaust gases as the volumetric flow rate of air through the engine decreases, because decreasing the volumetric flow rate of air through the engine results in smaller volumetric and mass-based flow rates of exhaust gases generated by the engine. Thus, under such conditions, a given amount of energy input into the flow of exhaust gas or the exhaust gas stream results in a larger temperature increase in the exhaust gases than if the volumetric flow rate of air through the engine had not been decreased relative to baseline levels.

In some embodiments, the electric generator described above that is driven by and applies a load to the engine is the source of the energy that is input into the exhaust gas stream. For example, the electric generator can act as the source of electric energy by generating electric energy that is directly transmitted to the electrically heated catalyst system and input by the electrically heated catalyst system into the exhaust gas stream. As another example, the electric generator can act as the source of electric energy by generating electric energy that is transmitted to and stored in a battery, and then withdrawn from the battery and transmitted to the electrically heated catalyst system and input by the electrically heated catalyst system into the exhaust gas stream.

In some implementations, an internal combustion engine idling under baseline conditions can produce or generate at least 0.5 kW, 1.0 kW, 1.5 kW, 2.0 kW, 3.0 kW, 4.0 kW, 5.0 kW, 6.0 kW, 7.0 kW, 8.0 kW, 9.0 kW, or 10.0 kW, and no more than 1.0 kW, 1.5 kW, 2.0 kW, 3.0 kW, 4.0 kW, 5.0 kW, 6.0 kW, 7.0 kW, 8.0 kW, 9.0 kW, 10.0 kW, or 11.0 kW of power. Such power can be used to drive parasitic components of the vehicle, such as air conditioning, radio, and/or fans, such as via an alternator. In some implementations, the load of the electric generator demands and draws at least 1.0 kW, 2.0 kW, 3.0 kW, 4.0 kW, 5.0 kW, 6.0 kW, 7.0 kW, 8.0 kW, 9.0 kW, 10.0 kW, 11.0 kW, 12.0 kW, 13.0 kW, 14.0 kW, 15.0 kW, 16.0 kW, 17.0 kW, 18.0 kW, 19.0 kW, 20.0 kW, 21.0 kW, 22.0 kW, 23.0 kW, 24.0 kW, 25.0 kW, 26.0 kW, 27.0 kW, 28.0 kW, 29.0 kW, or 30.0 kW, and no more than 2.0 kW, 3.0 kW, 4.0 kW, 5.0 kW, 6.0 kW, 7.0 kW, 8.0 kW, 9.0 kW, 10.0 kW, 11.0 kW, 12.0 kW, 13.0 kW, 14.0 kW, 15.0 kW, 16.0 kW, 17.0 kW, 18.0 kW, 19.0 kW, 20.0 kW, 21.0 kW, 22.0 kW, 23.0 kW, 24.0 kW, 25.0 kW, 26.0 kW, 27.0 kW, 28.0 kW, 29.0 kW, 30.0 kW, or 31.0 kW of additional power from the internal combustion engine.

In some cases, a ratio of the amount of energy input into the exhaust gas stream, such as by an electrically heated catalyst system, to the amount of energy drawn from the internal combustion engine, such as by an electrical generator, can be 50%, between 45% and 55%, between 40% and 60%, between 35% and 65%, or between 30% and 70%. In some cases, a ratio of an amount of energy input into the exhaust gas stream by an electrically heated catalyst system to the amount of energy received from an electrical generator by the electrically heated catalyst system (e.g., the efficiency of the electrically heated catalyst system) is about 90%, or between 85% and 95%, and a ratio of an amount of energy generated by the electrical generator to the amount of energy drawn by the electrical generator from the internal combustion engine (e.g., the efficiency of the electrical generator) is about 50%, or between 45% and 55%.

Any or all of the actions or steps described herein may be performed simultaneously or concurrently with one another, or within one second, two seconds, five seconds, ten seconds, thirty seconds, or sixty seconds of one another. Thus, the effects and advantages of each of the actions or steps may interact with one another to compound the temperature increases resulting in the exhaust gas flow. The methods described herein may also increase the energy content of an exhaust gas stream at a given operating speed over baseline conditions and operation.

Described herein are methods of improving SCR performance that include reducing air flow through an internal combustion engine, such as by cylinder deactivation. Such methods may also include mechanically loading the engine using an electric generator such as an alternator to increase the power demanded of the engine, which while driving maintains the torque demand and while idling forces the engine to inject more fuel to maintain the engine's speed. For a fixed engine speed and a fixed number of cylinders firing, the air flow will be maintained near constant, so the additional fuel will result in a change in engine air-to-fuel ratio. Under baseline operation, a diesel engine runs very lean, which results in cool exhaust temperatures. For a constant air flow, if the air-to-fuel ratio is adjusted from a very lean condition toward stoichiometric (balance air-to-fuel ratio for combustion), the exhaust gas temperature increases.

Figure 5:
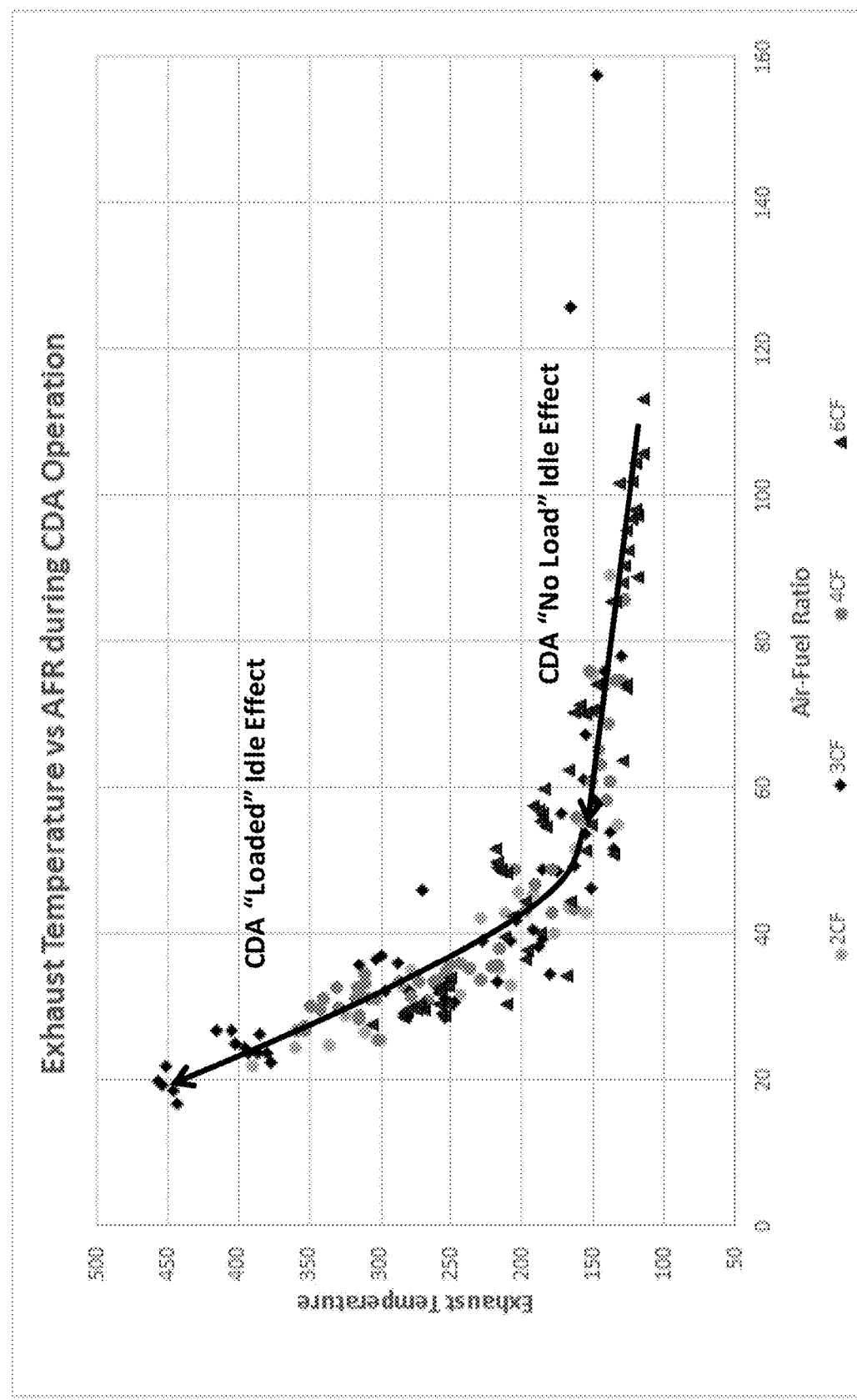
FIG. 5 illustrates exhaust gas temperatures as a function of engine air-to-fuel ratio for a six cylinder engine under baseline (six cylinders firing) and cylinder deactivation (three cylinders firing) operation.

FIG. 5 shows exhaust gas temperature at idle as a function of air-to-fuel ratio for a 6 cylinder engine under baseline (six cylinders firing) and CDA operation. FIG. 5 shows CDA operation for three cylinders firing (which may be referred to herein as "3CF"), but the number of cylinders firing is not limited to three, and is instead an additional variable that can be used to adjust the air-to-fuel ratio. Note that there are two basic regions of operation, a first region where the exhaust temperature variation with air-to-fuel ratio has a very shallow slope, and small temperature gains are realized for large air-to-fuel ratio changes (in the range of about 150:1 to about 40:1 air-to-fuel ratio) and a second region where the exhaust temperature variation with air-to-fuel ratio has a very steep slope. FIG. 5 also shows that under idle conditions, air-to-fuel ratios greater than about 35 are below the threshold for efficient SCR operation.

Under baseline operation a given, typical engine may idle with an air-to-fuel ratio around 60:1. Under 3CF CDA, the same engine may idle with an air-to-fuel ratio around 40:1 and there is a slight increase in exhaust temperature realized for using CDA. A temperature rise of about 20° C. is typical for a heavy-duty diesel engine at idle, which can be seen on the graph by comparing the exhaust temperature at an air-to-fuel ratio of 60:1 to the exhaust temperature at an air-to-fuel ratio of 40:1. If an electrical generator is driven by the engine and used to add heat to the exhaust by driving an electrical heater in the exhaust, then the mechanical load of the generator will cause the air-to-fuel ratio to be reduced. This effect happens under both baseline and CDA operation. However, under baseline operation, loads in excess of practical limits would need to be applied to achieve an air-to-fuel ratio in the region of high exhaust temperature variation with air-to-fuel ratio.

Under CDA operation, in contrast, the starting air-to-fuel ratio is much closer to the "knee" of the air-to-fuel ratio curve where substantial increases in exhaust temperature are realized for small changes in the air-to-fuel ratio. Loading the engine with an electric generator under CDA therefore results in a reduced air-to-fuel ratio in the range where substantial increases in exhaust temperatures can be realized. Analyses were performed to estimate the shift in air-to-fuel ratio realized by an idling engine under baseline and 3CF CDA operation by applying about 5 kw of electric generation load on the engine. It was found that, for baseline operation, the air-to-fuel ratio might be expected to shift from about 60:1 to about 45:1 and the increase in exhaust temperature might be expected to be about 20° C. For 3CF operation of the same engine, the result of the electric loading might be expected to shift the air-to-fuel ratio from about 40:1 to about 25:1 and the increase in the exhaust gas temperature might be expected to be about 80° C., which places the engine exhaust in a temperature range where high SCR efficiency may be realized.

The electric load applied to the engine and the number of cylinders firing or deactivated may be manipulated to control the air-to-fuel ratio in a range where manipulation of the air-to-fuel ratio results in relatively high changes in exhaust temperature. Thus, the engine exhaust temperature may be maintained in an elevated state and high enough to ensure sufficient SCR performance and efficiency to meet NOX emissions standards. Practical limits to electric generators, heaters, and wiring may render such methods impractical for baseline (6 cylinder) operation.

Figure 6A:
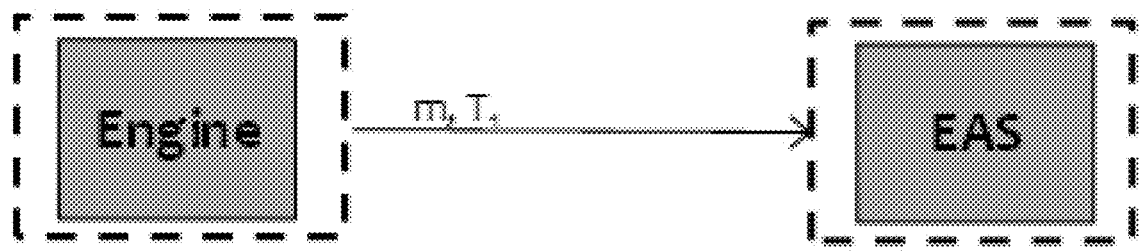
FIG. 6A provides a schematic diagram of a system including an engine and an EAS where a baseline energy equation applies.

A baseline energy equation that can be used to characterize the methods and techniques described herein is $Q_0 = \dot{m} \times c_p \times T$, where $Q_0$ is energy, m is the mass flow of exhaust, $c_p$ is the specific heat of the exhaust, and T is the exhaust temperature. FIG. 6A provides a schematic diagram of a system including an engine and an EAS where this equation applies. In this equation, the energy of the exhaust from the engine is a function of the mass flow and temperature of the exhaust. Another energy equation can be formulated that governs the same system but with the addition of supplemental energy, such as electrical energy, into the exhaust to raise the temperature of the exhaust, as follows:

$$T_2 = T_1 + \frac{Q_E}{\dot{m} x c p}.$$

Figure 6B:
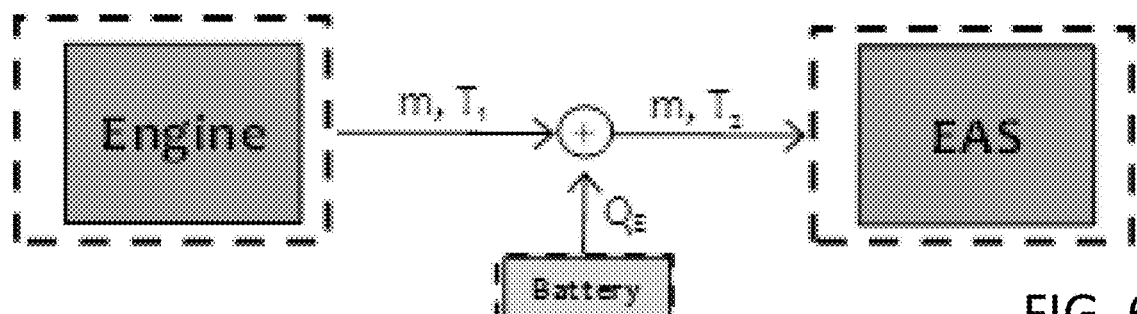
FIG. 6B provides a schematic diagram of a system including an engine and an EAS where a modified version of the baseline energy equation applies.

FIG. 6B provides a schematic diagram of a system including an engine and an EAS where this equation applies.

Another equation can be formulated that governs the system of FIG. 6A but with reduced air flow in the engine using 3CF CDA to increase the exhaust temperature at a given engine speed due to a reduced air-to-fuel ratio and reduced pumping losses from the engine (due to fewer firing cylinders), as follows:

$$Q_0 = \frac{\dot{m}}{2} x c_p x T_3.$$

Figure 6C:
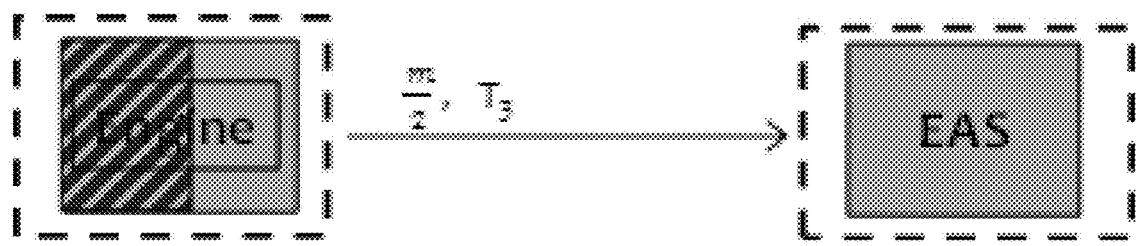
FIG. 6C provides a schematic diagram of another system including an engine and an EAS where another modified version of the baseline energy equation applies.

FIG. 6C provides a schematic diagram of a system including an engine and an EAS where this equation applies. Another equation can be formulated that governs the system of FIG. 6A but with both reduced air flow in the engine using 3CF CDA, a load applied to the engine in the form of an electrical generator, and addition of supplemental energy, such as electrical energy from the electrical generator, into the exhaust to raise the temperature of the exhaust as follows:

$$T_5 = T_4 + \frac{Q_E}{\frac{\dot{m}}{2} x c p}.$$

Figure 6D:
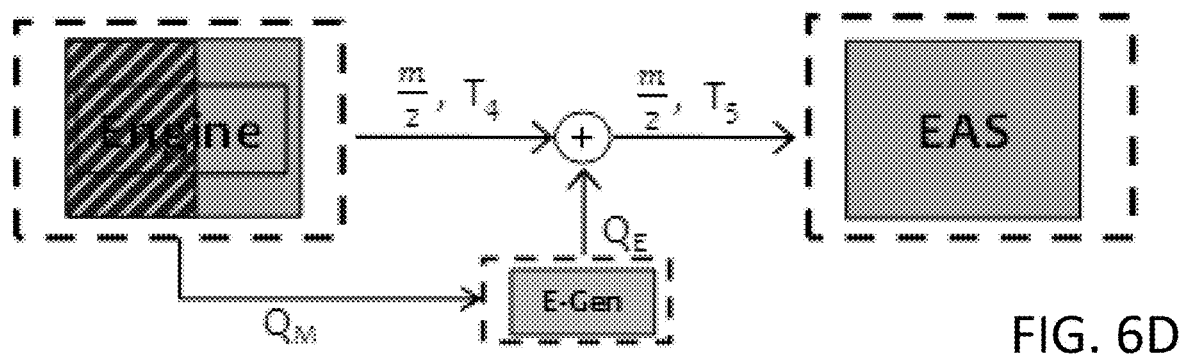
FIG. 6D provides a schematic diagram of another system including an engine and an EAS where another modified version of the baseline energy equation applies.

FIG. 6D provides a schematic diagram of a system including an engine and an EAS where this equation applies.

Figure 7:
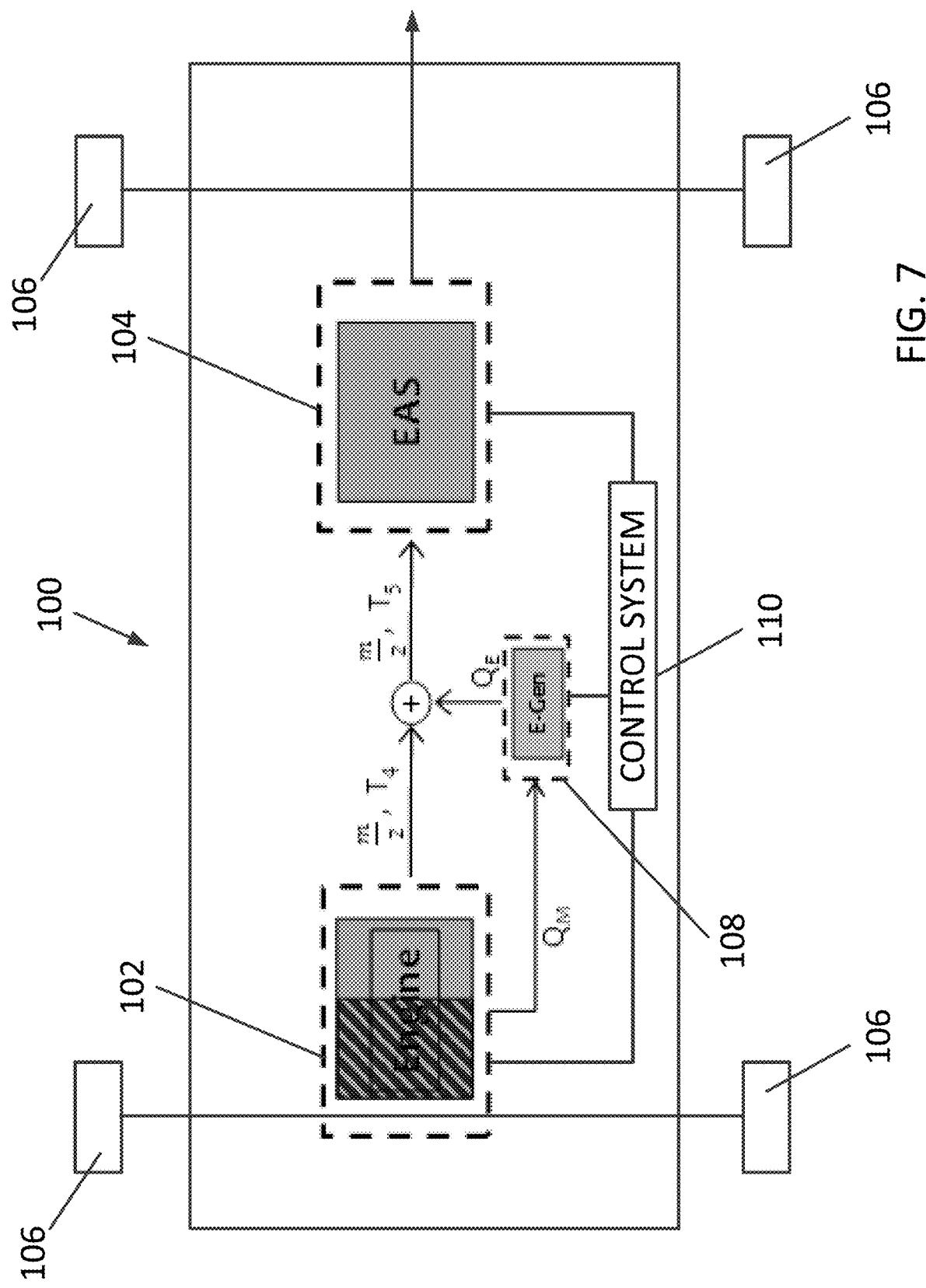
FIG. 7 illustrated a vehicle including an internal combustion engine, and exhaust after-treatment system, an electrical generator, and a control system configured to control such components to perform the methods described herein.

FIG. 7 illustrates a schematic diagram of a vehicle 100, which may be a heavy-duty vehicle, with an internal combustion engine 102, which may be a diesel engine, an exhaust after-treatment system 104, a set of at least four wheels 106 configured to be powered and driven by the engine 102, an electrical generator 108, and a control system 110, which can perform the methods described herein. When the vehicle 100 is in operation, the control system 110 can be used to control operation of portions of the vehicle 100, including its internal combustion engine 102 and its exhaust after-treatment system 104. For example, the control system 110 may be configured to control the engine 102 to idle with any number of its cylinders firing and any number of its cylinders deactivated, to control the engine 102 to drive the electric generator 108, and to direct electrical energy generated by the electrical generator 108 into an exhaust gas stream at a location between the engine 102 and the exhaust after-treatment system 104. As another example, the control system 110 may be configured to control the exhaust after-treatment system 104 and components thereof, including a diesel oxidation catalyst (DOC) to oxidize unburned fuel and carbon monoxide, a diesel particulate filter (DPF) to control particulate matter (PM), a selective catalytic reduction (SCR) system to reduce oxides of nitrogen (NOX), and an ammonia oxidation catalyst (AMOX) system.

In some embodiments, the vehicle 100 may include a plurality of sensors that collect and transmit data regarding operating parameters of the vehicle 100 to the control system 110, such as continuously. For example, such sensors may collect and transmit data regarding an exhaust gas temperature and/or an operating speed of the internal combustion engine 102 (e.g., in RPM) to the control system 110. In some embodiments, the control system 110 may control operation of the vehicle 100, such as in accordance with any of the techniques described herein, based on such measurements and data, such as when such measurements fall below certain specified thresholds, e.g., when the exhaust gas temperature falls below any of the exhaust gas temperatures mentioned herein, such as 190° C., or when the internal combustion engine 102 is idling, as identified, for example, when the operating speed of the internal combustion engine 102 falls below 550 RPM, or 600 RPM, or 650 RPM, or 700 RPM, or 750 RPM, or 800 RPM.

The methods described herein use the compounding effect of reduced exhaust flow, manipulation of the air-to-fuel ratio using mechanical loading by a generator or alternator, and input of electrical power into the exhaust as supplemental heat to obtain a large increase in idling and low load exhaust gas temperature from an engine. An additional feature of such embodiments is that they provide higher exhaust gas temperature at lower fuel consumption compared to baseline idle strategies.

Analyses were performed to determine the effect of the systems, methods, and techniques described herein on overall fuel efficiency of heavy duty vehicles over the proposed LLC. Results were variable, but it was generally found that heating exhaust gas flows to temperatures suitable for effective SCR performance by CDA and electric heating, as described herein, resulted in a fuel savings relative to baseline operating conditions in which the exhaust is not heated, as well as with respect to electric heating techniques alone.

U.S. provisional patent application No. 62/868,689, filed Jun. 28, 2019, is hereby incorporated herein by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   warm idling an internal combustion engine, thereby producing exhaust;
   reducing a speed at which firing cylinders of the internal combustion engine run during the warm idling of the internal combustion engine, thereby reducing a volumetric flow rate of air through the engine;
   increasing a mechanical load to the engine, thereby increasing an amount of fuel demanded by the engine; and
   inputting energy from a source of electrical energy into the exhaust.

2. The method of claim 1, wherein increasing a mechanical load to the engine includes using the running engine to drive an electric generator.

3. The method of claim 2, further comprising charging a battery with electric energy generated by the electric generator.

4. The method of claim 2 wherein the electric generator is the source of electric energy.

5. The method of claim 1 wherein inputting energy into the exhaust includes using an electrically heated catalyst system.

6. The method of claim 1 wherein reducing the volumetric flow rate of air through the engine includes reducing the volumetric flow rate of air through the engine by half.

7. The method of claim 1, further comprising deactivating one or more cylinders of the engine.

8. The method of claim 1, further comprising recirculating the exhaust through the engine.

9. The method of claim 1 wherein reducing the speed at which the firing cylinders run is performed simultaneously with increasing a mechanical load to the engine and inputting energy into the exhaust.

10. The method of claim 1 wherein reducing the speed at which the firing cylinders run is performed concurrently with increasing a mechanical load to the engine and inputting energy into the exhaust.

11. A heavy duty vehicle, comprising:
    an internal combustion engine;
    an exhaust after-treatment system; and
    a control system;
    wherein the control system, in operation, controls the vehicle, the internal combustion engine, and the exhaust after-treatment system to simultaneously:
       idle the internal combustion engine and reduce a speed at which firing cylinders of the internal combustion engine run during the idling of the internal combustion engine;
       use the internal combustion engine to drive an electric generator; and
       input electrical energy generated by the electric generator into exhaust produced by the internal combustion engine.

12. The vehicle of claim 11 wherein the control system, in operation, controls the vehicle, the internal combustion engine, and the exhaust after-treatment system to simultaneously:
    warm idle the internal combustion engine with at least one cylinder of the engine firing and at least one cylinder of the engine deactivated;
    use the internal combustion engine to drive the electric generator; and
    input the electrical energy generated by the electric generator into exhaust produced by the internal combustion engine.

13. The vehicle of claim 11 wherein the internal combustion engine is a diesel engine.

14. The vehicle of claim 11 wherein the exhaust after-treatment system includes a diesel oxidation catalyst.

15. The vehicle of claim 11 wherein the exhaust after-treatment system includes a diesel particulate filter.

16. The vehicle of claim 11 wherein the exhaust after-treatment system includes a selective catalytic reduction system.

17. The vehicle of claim 11 wherein the exhaust after-treatment system includes an ammonia oxidation catalyst system.

* * * * *